United States Patent [19]
De Haan et al.

[11] Patent Number: 6,034,734
[45] Date of Patent: Mar. 7, 2000

[54] VIDEO SIGNAL SCAN CONVERSION

[75] Inventors: Gerard De Haan; Paul W. A. C. Biezen, both of Eindhoven, Netherlands

[73] Assignee: U.S. Philips Corporation, New York, N.Y.

[21] Appl. No.: 08/742,686

[22] Filed: Oct. 31, 1996

[30] Foreign Application Priority Data

Nov. 1, 1995 [EP] European Pat. Off. .............. 95202949

[51] Int. Cl.[7] ...................................................... H04N 7/01
[52] U.S. Cl. ............................ 348/458; 348/452; 348/448
[58] Field of Search ...................................... 348/448–452, 348/447; H04N 7/01, 11/20

[56] References Cited

U.S. PATENT DOCUMENTS

| | | | |
|---|---|---|---|
| 5,021,870 | 6/1991 | Motoe et al. | 358/11 |
| 5,051,826 | 9/1991 | Ishii et al. | 348/448 |
| 5,386,237 | 1/1995 | Knee | 348/458 |
| 5,532,750 | 7/1996 | De Haan et al. | |

*Primary Examiner*—Michael H. Lee
*Attorney, Agent, or Firm*—Steven R. Biren

[57] ABSTRACT

In a scan conversion method of generating an output video signal from an interlaced input signal, including the steps of furnishing (1) a first signal having first lines ($F_i(x-(0, 1)^T, n)$) corresponding to original lines of the interlaced input signal, and second lines ($F_i(x, n)$) in addition to the first lines ($F_i(x-(0, 1)^T, n)$); and providing (5, 11, 7, 13) a second signal which is delayed or advanced with respect to the first signal, the second signal having first processed lines ($F_{out}(x-(0, 1)^T-D, n-1)$) corresponding to the original lines, and second processed lines ($F_{out}(x-D, n-1)$) corresponding to the second lines ($F_i(x, n)$); output lines ($F_{out}(x, n)$) of the output video signal are obtained in dependence upon a first difference between the first processed lines ($F_{out}(x-(0, 1)^T-D, n-1)$) and the first lines ($F_i(x-(0, 1)^T, n)$), and a second difference between the second processed lines ($F_{out}(x-D, n-1)$) and the second lines ($F_i(x, n)$).

13 Claims, 2 Drawing Sheets

VIDEO SIGNAL SCAN CONVERSION

BACKGROUND OF THE INVENTION

1. Field of the Invention

The invention relates to a method and apparatus for video signal scan conversion, and to a video signal display apparatus comprising such a conversion apparatus.

2. Description of the Related Art

WO-A-95/27362, corresponding to U.S. Pat. No. 5,532, 750 (Attorney's reference PHN 14,794), discloses a method of converting an interlaced video signal into an output sequentially scanned video signal. A first sequentially scanned video signal is furnished in dependence upon the interlaced video signal. Subsequently, a motion-compensated sequentially scanned signal is furnished in dependence upon the first sequentially scanned video signal. All video lines of the output sequentially scanned video signal are generated in dependence upon both the first sequentially scanned video signal and the motion-compensated sequentially scanned signal to prevent inaccuracies in motion vectors used in the motion-compensated processing operation from resulting in visible distortions. The first sequentially scanned video signal and the motion-compensated sequentially scanned signal are combined to furnish the output sequentially scanned video signal by means of a first mixer for first lines positionally corresponding to original lines of a present field of the interlaced video signal, a second mixer for second lines positionally corresponding to interpolated lines between the original lines, and a multiplexer for line-alternately selecting an output of the first mixer or an output of the second mixer.

SUMMARY OF THE INVENTION

It is, inter alia, an object of the invention to provide an improved video signal scan conversion.

Accordingly, a first aspect of the invention provides a method of generating an output video signal from an interlaced input signal, comprising the steps of:

furnishing a first signal having first lines ($F_i(x-(0, 1)^T, n)$) corresponding to original lines of the interlaced input signal, and second lines ($F_i(x, n)$) in addition to the first lines ($F_i(x-(0, 1)^T, n)$); and providing a second signal which is delayed or advanced with respect to the first signal, the second signal having first processed lines ($F_{out}(x-(0, 1)^T-D, n-1)$) corresponding to the original lines, and second processed lines ($F_{out}(x-D, n-1)$) corresponding to the second lines ($F_i(x, n)$);

in which output lines ($F_{out}(x, n)$) of the output video signal are obtained in dependence upon a first difference between the first processed lines ($F_{out}(x-(0, 1)^T-D, n-1)$) and the first lines ($F_i(x-(0, 1)^T, n)$), and a second difference between the second processed lines ($F_{out}(x-D, n-1)$) and the second lines ($F_i(x, n)$).

Preferably, the output video signal is a sequentially scanned video signal, and the method comprises the further step of combining the first signal and said second signal to obtain the output sequentially scanned video signal having first output lines ($F_{out}(x-(0, 1)^T, n)$) corresponding to the original lines, and the output lines ($F_{out}(x, n)$) between the first output lines ($F_{out}(x-(0, 1)^T, n)$). Advantageously, the output lines ($F_{out}(x, n)$) of the output video signal are obtained further in dependence upon a relation between the first lines ($F_i(x-(0, 1)^T, n)$) and the first output lines ($F_{out}(x-(0, 1)^T, n)$).

A refinement of the first aspect of the invention provides that the output lines are obtained in dependence upon the second difference and a third difference between the first output lines ($F_{out}(x-(0, 1)^T, n)$) and the first processed lines ($F_{out}(x-(0, 1)^T-D, n-1)$), in which the first difference as well as the relation between the first lines and the first output lines are replaced by a third difference which is equivalent thereto in a preferred embodiment of the invention.

Another refinement of the first aspect of the invention provides that the combining step is controlled such that a difference between the output lines ($F_{out}(x, n)$) and the second processed lines ($F_{out}(x-D, n-1)$) corresponds to a difference between the first output lines ($F_{out}(x-(0, 1)^T, n)$) and the first processed lines ($F_{out}(x-(0, 1)^T-D, n-1)$). The above-mentioned aspects of the invention improve the consistency along the motion trajectory or, put in other words, a smoother picture is obtained for moving objects.

A second aspect of the invention provides a scan conversion apparatus for generating an output video signal from an interlaced input signal, comprising means for furnishing a first signal having first lines ($F_i(x-(0, 1)^T, n)$) corresponding to original lines of said interlaced input signal, and second lines ($F_i(x, n)$) in addition to said first lines ($F_i(x-(0, 1)^T, n)$); and means for providing a second signal which is delayed or advanced with respect to said first signal, said second signal having first processed lines ($F_{out}(x-(0, 1)^T-D, n-1)$) corresponding to said original lines, and second processed lines ($F_{out}(x-D, n-1)$) corresponding to said second lines ($F_i(x, n)$); characterized in that said apparatus further comprises means for generating output lines ($F_{out}(x, n)$) of said output video signal in dependence upon a first difference between said first processed lines ($F_{out}(x-(0, 1)^T-D, n-1)$) and said first lines ($F_i(x-(0, 1)^T, n)$), and a second difference between said second processed lines ($F_{out}(x-D, n-1)$) and said second lines ($F_i(x, n)$).

A third aspect of the invention provides a video signal display apparatus incorporating such a scan conversion apparatus as described.

DESCRIPTION OF THE PREFERRED EMBODIMENTS

1. Introduction

Figure 1:
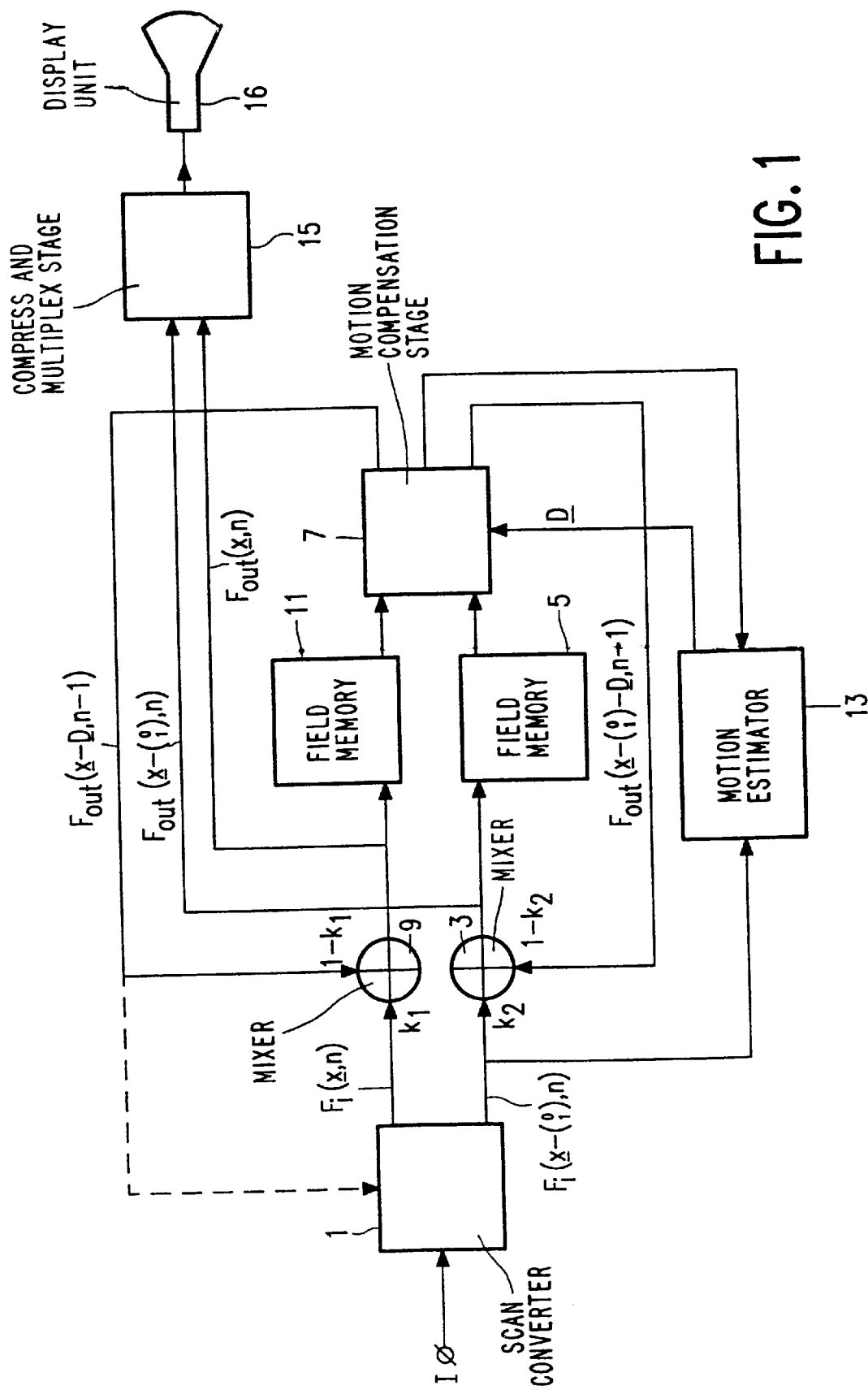
FIG. 1 illustrates an embodiment of a television receiver comprising a sequential scan converter in accordance with the present invention.

De-interlacing is a basic operation required for most video scanning format conversions. Vertical and temporal interpolation of image data cause practical and fundamental difficulties, as the conditions of the sampling theorem are generally not met in video signals. Linear methods, based on sampling rate conversion theory, therefore negatively influence the resolution and/or the motion portrayal. The more advanced algorithms can be characterized by their common attempt to interpolate the 3-D image data in the direction with the highest correlation. To this end, they either have an explicit or implicit detector to find this direction. In case of 1-D temporal interpolation the explicit detector is usually called a motion detector, for 2-D spatial interpolation it is called an edge detector, while the most advanced device estimating the optimal spatio-temporal 3-D interpolation direction is a motion estimator. The interpolation filter can either be recursive or transversal, but the number of taps in the temporal direction is preferably small.

Recently, some papers have been published proposing a recursive scheme for motion compensated sequential scan conversion (References [1] and [2]). Experiments indicate that the recursiveness yields a significant improvement of the motion-compensated median (Reference [3]), on which these algorithms are based, if good quality motion vectors are available. Furthermore, recursiveness is expected to allow an improved performance on critical velocities, compared to recently published methods applying generalized sampling theory (Reference [4]), if the velocities are accelerating. In this application an improved recursive sequential scan conversion algorithm is introduced that suppresses remaining artifacts of the prior art further. The invention provides the algorithms and a novel evaluation method that shows the improvement in an objective score. For high quality, sub-pixel accurate motion estimation the algorithm of (Reference [5]) is used.

2. De-interlacing techniques

In general, the samples required for the motion compensated de-interlacing do not exist in the time discrete input signal, e.g. due to non-integer velocities. In the horizontal domain this problem can be solved with linear Sampling Rate Conversion (SRC) theory, e.g. (Reference [6]), but not in the vertical domain, as the constraints of the sampling theorem are not met. Three different solutions for this problem have been proposed recently in the literature:

(1) A straight extension of the motion vector into earlier pictures until it points (almost) to an existing pixel (Reference [7]).

(2) The application of a generalized sampling theory (GST) (Reference [4]).

(3) Recursive de-interlacing of the signal (Reference [1] and [2]).

Solution (1) is valid only if we assume the velocity constant over a larger temporal instance. This is a rather severe limitation which makes the method practically useless.

The implication of GST is that it is possible to perfectly reconstruct a signal sampled at 1/n times the Nyquist rate with n independent sets of samples that describe the signal. For the de-interlacing problem n=2, and the required two sets are the current field and the motion compensated previous field. If the two do not coincide, i.e., the object does not have an odd vertical motion vector component, the independency constraint is fulfilled, and the problem can theoretically be solved. Practical problems are:

a) The velocity can have an odd vertical component.

b) A perfect reconstruction requires the use of pixels from many lines, for which the velocity needs not be constant.

c) For velocities near the vertical odds, noise may be enhanced.

Solution (3) is based on the assumption that it is possible at some time to have a perfectly de-interlaced picture in a memory. Once this is true, the picture is used to de-interlace the next input field. With motion compensation, this solution can be perfect as the de-interlaced picture in the memory allows the use of SRC-theory also in the vertical domain. If this new de-interlaced field is written in the memory, it can be used to de-interlace the next incoming field etc. Limitations of this method are:

(I) Propagation of errors due to motion vector inaccuracy and interpolation defects (II) Even a perfectly de-interlaced picture can contain alias in the vertical frequency domain, assuming the common case of a camera without optical pre-filter.

In practice problem (I) is the more serious, particularly for nearly odd vertical velocities and/or noisy input signals.

We concluded that recursive de-interlacing and de-interlacing based on GST are the best methods presently known. However, even these best methods are imperfect. It is our target to present an improvement that can be applied in combination with both methods to suppress the remaining artifacts in the de-interlaced output signal. In fact, our proposal can be used to improve any de-interlacing algorithm.

3. Description of the Applied Algorithms

In Reference [1] a time-recursive de-interlacing algorithm is proposed in which the lines that need to be interpolated are found by motion compensating the previously found de-interlaced output frame:

$$F_{out}(\underline{x}, n) = \begin{cases} F(\underline{x}, n), & \text{(original lines)} \\ F_{out}(\underline{x} - \underline{D}(\underline{x}, n), n-1), & \text{(interpolated lines)} \end{cases} \quad (1)$$

where F(x, t) is the interlaced input signal, $F_{out}(x, n)$ the sequential output, n the field number, and x is the spatial position.

To prevent errors from propagating, in Reference [1] several additional measures are described to protect the interpolated lines. Particularly, the median filter is proposed to realize this protection:

Although further alternatives are suggested in Reference [1], we will use this algorithm as the basis for our comparison.

$$F_i(\underline{x}, n) = \begin{cases} F(\underline{x}, n), & \text{(original lines)} \\ \text{median}\begin{pmatrix} F\left(\underline{x} - \begin{pmatrix} 0 \\ -1 \end{pmatrix}, n\right), \\ \left(F\left(\underline{x} - \begin{pmatrix} 0 \\ +1 \end{pmatrix}, n\right)\right), \\ F_{out}(\underline{x} - \underline{D}(\underline{x}, n), n-1) \end{pmatrix}, & \text{(interpolated lines)} \end{cases} \quad (2)$$

As we expect the quality of Reference the resulting algorithm to depend heavily on the performance of the motion estimator, we applied the motion estimation method of [5]. This high quality algorithm yields a quarter pixel accuracy, and a close to true-motion vector field which is considered very important for scan rate conversion. Rather than calculating all possible candidate vectors, this recursive search block-matcher takes spatial and/or temporal "prediction vectors" from a 3-D neighborhood, and a single updated prediction vector. This implicitly assumes spatial and/or temporal consistency. The updating process involves update vectors added to either of the spatial prediction vectors. We applied a candidate set CS(X, n), from which the block-matcher selects its result vector, defined by:

$$CS(\underline{X}, n) = \left\{ \underline{C} \in CS^{max} \mid \underline{C} = \underline{D}\left(\underline{X} - \begin{pmatrix} X \\ Y \end{pmatrix}, n\right) + \underline{U}_a(\underline{X}, n) \bigvee \underline{C} = \underline{D}\left(\underline{X} - \begin{pmatrix} -X \\ Y \end{pmatrix}, n\right) + \underline{U}_b(\underline{X}, n) \right\} \cup \quad (3)$$

-continued $$\left\{\underline{D}\left(\underline{X} - \begin{pmatrix} X \\ Y \end{pmatrix}, n\right), \underline{D}\left(\underline{X} - \begin{pmatrix} -X \\ Y \end{pmatrix}, n\right), \underline{C} = \underline{D}\left(\underline{X} + \begin{pmatrix} 0 \\ 2Y \end{pmatrix}, n-1\right)\right\}$$

where the update vectors $U_a(X, n)$ and $U_b(X, n)$ are alternatingly (on block basis) available, and are taken from a limited fixed integer update set, in our case:

$$US_i = \qquad (4)$$

$$\left\{\begin{pmatrix} 0 \\ 0 \end{pmatrix}, \begin{pmatrix} 0 \\ 1 \end{pmatrix}, \begin{pmatrix} 0 \\ -1 \end{pmatrix}, \begin{pmatrix} 0 \\ 2 \end{pmatrix}, \begin{pmatrix} 0 \\ -2 \end{pmatrix}, \begin{pmatrix} 1 \\ 0 \end{pmatrix}, \begin{pmatrix} -1 \\ 0 \end{pmatrix}, \begin{pmatrix} 3 \\ 0 \end{pmatrix}, \begin{pmatrix} -3 \\ 0 \end{pmatrix}\right\}$$

To realize sub-pixel accuracy, the update set of equation (4) is extended with fractional update values. We realized a quarter pixel resolution by adding the following fractional update vectors to the update set:

$$US_f = \left\{\begin{pmatrix} 0 \\ 0.25 \end{pmatrix}, \begin{pmatrix} 0 \\ -0.25 \end{pmatrix}, \begin{pmatrix} 0.25 \\ 0 \end{pmatrix}, \begin{pmatrix} -0.25 \\ 0 \end{pmatrix}\right\} \qquad (5)$$

Because of the small number of candidate vectors, the method is very efficient and realizes, due to the inherent smoothness constraint, very coherent and close to true-motion vector fields, most suitable for scanning format conversion.

4. Recursive de-interlacing algorithm

The main imperfection of the recursive de-interlacing algorithm is remaining alias in the output signal. Although this imperfection is usually worse for alternative methods, further improvement seems attractive. Difficulty with this defect is that it is hardly visible in single images but mainly in moving sequences. This makes it difficult to illustrate, while also quantitative measures to show the improvement seem to lack.

A common method for evaluating the de-interlacing quality is comparing an original sequentially scanned image with a de-interlaced result using a, what we will call here, MSEs-criterion:

$$MSE_s(n) = 1/N \sum_{\underline{x} \in field} (F_{orig}(\underline{x}, n) - F_{out}(\underline{x}, n))^2 \qquad (6)$$

This criterion is not exclusively sensitive for remaining alias, as it sums all differences without discriminating for different backgrounds, e.g., due to resolution losses, noise, vector errors, etc. An additional inconvenience of this criterion is that it cannot be applied to check the performance of the algorithm on original interlaced source signals.

In a perfectly de-interlaced picture (without residual alias), a characteristic is that the sequence is stationary along the motion trajectory, in picture parts for which the motion model is valid. Based upon this characteristic, an alternative was suggested in where we measured how well the current interlaced input field n was predicted by the motion compensated previously de-interlaced field:

$$MSE_i(n) = 1/N \sum_{\underline{x} \in field} (F(\underline{x}, n) - F_{out}(\underline{x} - \underline{D}(\underline{x}, n), n-1))^2 \qquad (7)$$

This method has the advantage that it can be applied to judge the performance in absence of an original sequentially scanned sequence. However, the measure has limited value in case of critical velocities, as in that case the quality of the interpolated lines is not reflected in the figure.

In an attempt to improve on this aspect, it is possible to measure a "Motion Trajectory Inconsistency" (MTI(n)) for all output lines in field n, which we will define as:

$$MTI(n) = 1/N \sum_{\underline{x} \in field} (F_{out}(\underline{x}, n) - F_{out}(\underline{x} - \underline{D}(\underline{x}, n), n-1))^2 \qquad (8)$$

A problem with this measure is that a good score on this criterion is a necessary but not sufficient constraint in the processing. It is possible, e.g. applying a strong temporal filtering, to force this MTI to very low values, while obviously the picture quality is degraded. However, a lower score on the MTI criterion coupled to a hardly varying MSE score is a strong indication for quality improvement. There is a clear analogy with the motion vector smoothness constraint (see Reference [8]), where motion estimation techniques have been improved by adding a smoothness term in the match criterion which yields a significant consistency improvement accepting a slight MSE degradation. Quite similarly, it is possible here to introduce a de-interlacing cost figure defined as:

$$Cost(n) = 1/N[MSE_i(n) + \alpha MTI(n)] = \qquad (9)$$

$$1/N \sum_{\underline{x} \in field} (F(\underline{x}, n) - F_{out}(\underline{x} - \underline{D}(\underline{x}, n), n-1))^2 +$$

$$\alpha/N \sum_{\underline{x} \in field} (F_{out}(\underline{x}, n) - F_{out}(\underline{x} - \underline{D}(\underline{x}, n), n-1))^2$$

The parameter $\alpha$ allows tuning of the cost function to match the subjective impression.

After quantifying "remaining alias" applying equation (9), an improvement of the MTI figure could be realized by suppressing non-stationarities along the motion trajectory. As long as this does not seriously degrades the MSE-score, it brings an improved Cost-score and, with $\alpha$ tuned correctly, also an improved subjective performance.

As non-stationarities can reside on interpolated lines as well as on original lines, the implication would be that both have to be temporally filtered. That filtering of original lines, which is somewhat contra-intuitive, helps to suppress remaining alias can also be understood from the vertical frequency spectrum of the signal on original and interpolated lines respectively. In the original recursive de-interlacing algorithm, the lines existing in the input field are always directly transferred to the output and never modified. As the first repeat spectrum of the interpolated lines will almost always suffer from inaccuracies in the motion vector estimates and the protection features, this spectrum cannot fully compensate for the (anti-phase) repeat spectrum resulting from the original lines.

As a consequence of the above, the recursive de-interlacing method that we propose interpolates not only the new lines, but, in an attempt to maximize the motion trajectory consistency on both type of lines equally strong, also the lines existing in the interlaced signal:

$$F_{out}(x, n) = k(R).(F_{out}(x - D(x, n), n-1) + (1 - k(R)).(F_i(x, n)) \qquad (10)$$

where $k(R)$ is a control parameter that reflects the reliability R of the motion vectors. $F_i(x, n)$ can be calculated according to equation (2) but also, with little disadvantage as we will show later, using a simpler intra-field interpolation:

$$F_i(\underline{x}, n) = \begin{cases} F(\underline{x}, n), & \text{(original lines)} \\ \left[F\left(\underline{x} + \begin{pmatrix} 0 \\ 1 \end{pmatrix}, n\right) + F\left(\underline{x} - \begin{pmatrix} 0 \\ 1 \end{pmatrix}, n\right)\right]/2, & \text{(interpolated lines)} \end{cases} \quad (11)$$

In the literature, sometimes the match error, or the match error corrected for the local picture contrast is used. When applying the 3-D Recursive Search block-matcher described in Reference [5], another indication for motion vector reliability is available. This recursive estimator, due to the use of spatial and temporal predictions, implicitly assumes consistent motion vector fields. If the output vector field is not smooth than the implicit assumption may be false, and therefore the motion vectors unreliable.

For this smoothness, any sum of absolute (or squared) differences of the current vector with its spatial and temporal neighbors can be applied, but using the 3-D RS block-matcher, we obtained good results using the following definition for the vector smoothness S:

$$S = \frac{\alpha}{\sum_{n \in N}(|D_x(\underline{p}-\underline{n}) - D_x(\underline{p})| + |D_y(\underline{p}-\underline{n}) - D_y(\underline{p})|)} \quad (12)$$

where $p=(x, y, t)^T$ is the spatio-temporal position, $\alpha$ is a constant selected experimentally, while the neighborhood N in which the neighboring vectors are found defined as:

$$N = \left\{ \begin{pmatrix} -X \\ -Y \end{pmatrix}, \begin{pmatrix} +X \\ -Y \end{pmatrix}, \begin{pmatrix} -X \\ +Y \end{pmatrix}, \begin{pmatrix} +X \\ +Y \end{pmatrix} \right\} \quad (13)$$

In this definition X and Y denote the horizontal and vertical block dimensions as used in the motion estimator respectively.

5. Refinements of the Algorithm

The severest drawbacks that were found with the above-described algorithm were:

(1) Large homogeneously moving picture parts occasionally break up into several areas with slightly different velocities (earthquakes).

(2) In areas where large displacement discontinuities occurred, blocking artifacts were sometimes visible. These are due to the reliability indicator being available on block base only.

The first of these difficulties is directly related to the fundament of the proposed method and, therefore, most difficult to cure: by recursively filtering both the original and the interpolated lines, the output becomes more and more "isolated from the input" if the reliability of the motion vectors is considered to be good. In this section, therefore, we introduce a solution to prevent the output pictures from drifting too far from the input material.

The basis for the refinement is to detect directly how far the filtered information on an original line differs from the unfiltered information and to reduce the filtering in case the deviation becomes to large. As this adaptation of the filtering can easily be realized on a pixel base, it further provides a means to cope with the drawback mentioned under number (2). The same difference is used to reduce the filtering of the interpolated lines, albeit that much larger differences turned out to be tolerable.

In the refined algorithm (modification of equation (2) the output luminance is found as:

$$F_{out}(\underline{x}, n) = \begin{cases} (1-k_1) \cdot (F_{out}(\underline{x} - \underline{D}(\underline{x}, n), n-1) + k_1 \cdot (F_i(\underline{x}, n)), & \text{interpolated lines} \\ (1-k_2) \cdot (F_{out}(\underline{x} - \underline{D}(\underline{x}, n), n-1) + k_2 \cdot (F_i(\underline{x}, n)), & \text{original lines} \end{cases} \quad (14)$$

and using a limiter function "clip" defined as:

$$\text{clip}(L, R, a) = \begin{cases} L, & (a < L) \\ R, & (a > R) \\ a, & (L \le a \le R) \end{cases} \quad (15)$$

$k_2$ is calculated as:

$$k_2 = 1/16 \cdot \text{clip}\left(0, 16, 10 - C_2 \cdot \sqrt{(1/S + \Delta) \cdot Diff}\right) \quad (16)$$

Consequently, $k_2$ is a function of the vector smoothness S, defined in equation (4), and of the (pixel-) difference, Diff, in the motion compensated recursive loop measured on original lines of the interlaced grid only:

$$Diff(\underline{x}, n) = \text{abs}\left(\sum_{\underline{x} \in W}(F_{out}(\underline{x} - \underline{D}(\underline{x}, n), n-1) - (F_i(\underline{x}, n)))\right) \quad (17)$$

where W is a window containing the six pixels nearest to the currently interpolated pixel on the lines directly above and below the interpolated pixel. As Diff is related to the $MSE_i(n)$ of equation (7), it is possible by appropriately choosing $C_1$, to tune the relative importance of $MSE_i(n)$ and MTI(n).

Although this tuning seems rather straightforward for the original lines, it is more complicated for the interpolated lines. For these lines, an MTI(n) figure can be calculated, but a significant $MSE_i(n)$ cannot be found, as the quality of the input lines to this temporal filter depends on the quality of the initial sequential scan conversion algorithm. To escape from this fundamental problem, we propose here to tune $k_1$ such that the contribution of original lines and interpolated lines to the MTI(n) figure is identical per pixel, disregarding the energy over the temporal filter for the interpolated lines. The assumption leads to:

$$|F_{out}(\underline{x}, n) - F_{out}(\underline{x} - \underline{D}, n-1)| = \left|F_{out}\left(\underline{x} - \begin{pmatrix} 0 \\ 1 \end{pmatrix} - \underline{D}, n-1\right) - F_{out}\left(\underline{x} - \begin{pmatrix} 0 \\ 1 \end{pmatrix}, n\right)\right| \quad (18)$$

while at the same time:

$$F_{out}(x, n) = k_1 F_i(x, n) + (1-k_1) F_{out}(x-D, n-1) \quad (19)$$

where $F_i(x, n)$ is the output of the initial de-interlacing algorithm, e.g., using equation (2) or (11). Combination of equations (18) and (19), results in a calculation of $k_1$ according to:

$$k_1(x,n) = \frac{\left|F_{out}\left(\underline{x} - \binom{0}{1}, n\right) - F_{out}\left(\underline{x} - \binom{0}{1} - \underline{D}, n-1\right)\right|}{|F_i(\underline{x},n) - F_{out}(\underline{x} - \underline{D}, n-1)|} \quad (20)$$

Combining this result with the lower part of equation (14) results in:

$$k_1(\underline{x},n) = \quad (21)$$

$$k_2\left(\underline{x} - \binom{0}{1}, n\right) \cdot \frac{\left|F_i\left(\underline{x} - \binom{0}{1}, n\right) - F_{out}\left(\underline{x} - \binom{0}{1} - \underline{D}, n-1\right)\right|}{|F_i(\underline{x},n) - F_{out}(\underline{x} - \underline{D}, n-1)|}$$

As an implication, the temporal recursive filtering on the interpolated lines depends on the quality of the initial de-interlacing method. A simple line averaging algorithm will cause stronger temporal filtering, of the interpolated lines, than e.g. a motion compensated median filter. Experimentally, we could show that the difference in resulting de-interlacing performance was small.

The assumption of equation (18) leads to an adaptation of temporal recursive filtering on the interpolated line applying differences measured on the upper neighboring original line. Rather than using the upper original line as a reference, the lower neighboring line can be used equally well. For symmetry considerations, the average effect on the two neighboring original lines seems advantageous. Elaborating this results in a symmetrical alternative for equation (20):

$$k_1(\underline{x},n) = \frac{(|A| + |B|)/2}{|F_i(\underline{x},n) - F_{out}(\underline{x} - \underline{D}, n-1)|} \quad (22)$$

with:

$$A = \left|F_{out}\left(\underline{x} - \binom{0}{1}, n\right) - F_{out}\left(\underline{x} - \binom{0}{1} - \underline{D}, n-1\right)\right| \quad (23)$$

$$B = \left|F_{out}\left(\underline{x} + \binom{0}{1}, n\right) - F_{out}\left(\underline{x} + \binom{0}{1} - \underline{D}, n-1\right)\right|$$

Rather than averaging the absolute differences, it is possible to take the absolute value of the average, the maximum of the two averages, or apply (2-D) spatial filters before and/or after the rectifier (abs). The choices resemble those commonly applied in motion detectors. It is furthermore possible to apply the above control of the temporal filter on the interpolated lines, while fixing the value of $k_2$ to no filtering on the original lines ($k_2$=1). Generally, this will lead to somewhat lower MSE$_i$(n) figures, but a significantly higher MTI(n) score.

In an alternative embodiment, $k_2$ is calculated as:

$$k_2 = \text{clip}(0, 1, C_2 \cdot \sqrt{Diff}) \quad (24)$$

with:

$$\text{Diff}(x,n) = \text{abs}(F_{out}(x - D(x,n), n-1) - (F_i(x,n))) \quad (25)$$

Consequently, $k_2$ is a function of the prediction error, Diff, in the motion compensated recursive loop. As Diff is related to the MSE(n) of equation (7), it is possible by appropriately choosing $C_2$, to tune the relative importance of MSE$_i$(n) and MTI(n).

As the quality of the interpolated pixels, as resulting from the initial de-interlacing method, is obviously less than that of the original pixels, the filtering of these pixels should be stronger. As, furthermore, Diff(x, n), at the position of the interpolated lines, has little value to determine the quality of the motion compensated prediction, we propose to control $k_1$ using:

$$k_1 = \text{clip}\left(0, 1, C_1 \cdot \sqrt{Diff\left(\underline{x} - \binom{0}{1}, n\right) + Diff\left(\underline{x} + \binom{0}{1}, n\right)}\right) \quad (26)$$

where $C_1$ is smaller than $C_2$, and the control of the recursive filter for interpolated pixels is derived from the quality of the motion compensated prediction at the vertically neighboring existing pixels.

There is a risk in filtering alternate lines differently, as it potentially introduces visible line structures. Although the advantage of high quality de-interlacing will be apparent in areas with vertical detail, there is no advantage in regions that lack such high vertical frequency components. Therefore, in order to prevent the introduction of line structure in image parts that never profit from individual filtering, $k_1$ is made equal to $k_2$ if:

$$\sqrt{Diff\left(\underline{x} - \binom{0}{1}, n\right) + Diff\left(\underline{x} + \binom{0}{1}, n\right)} \geq \sqrt{2 \cdot Diff(x,n)} \quad (27)$$

To evaluate the proposals resulting from the previous section, we selected a set of 4 critical sequences. The sequences contain vertical detail, and motion with various sub-pixel values in many directions. Using the algorithm of Reference [1], in the version described in section 2 as a above reference, we calculated MSEs and MTIs for another two algorithms, illustrating the proposals of this paper. The first algorithm is the one illustrated in FIG. 1, in which the control of the recursive loop is according to equations (24,26). The second algorithm has $k_2$ fixed at 1, i.e., no recursive filtering of the original pixels, and is further identical. Compared to the reference algorithm, both proposed new algorithms yield a slightly improved MSE$_i$ figure, which is expected to be mainly due to the elimination of median defects in the high spatial frequencies. The MTI figures, however, have been improved dramatically, particularly for the first algorithm, i.e., the algorithm that performs recursive filtering even on the original lines. MSE$_i$ figures of both algorithm differ only little. The additional recursive filtering of the original pixels mainly improves the MTI figure (with little or no disadvantage for the MSE$_i$ figure).

FIG. 1 shows the resulting architecture of the proposed de-interlacing algorithm. In FIG. 1, an interlaced input signal is applied from an input I to an initial sequential scan converter 1 which supplies original lines at its lower output and interpolated lines at its upper output. The original lines are applied to a motion compensation stage 7 thru a mixer 3 and a field memory 5. Similarly, the interpolated lines are applied to the motion compensation stage 7 thru a mixer 9 and a field memory 11. Motion vectors D for the motion compensation stage 7 are determined by a motion estimator 13 on the basis of the original lines supplied by the initial sequential scan converter 1 (or on the basis of the lines supplied by the mixer 3), and shifted lines supplied by the motion compensation stage 7. Motion compensated shifted lines are supplied by the motion compensation stage 7 to the mixers 3 and 9. The mixer 3 mixes the original lines and the motion compensated shifted lines in the ratio k2: (1−k2). The mixer 9 mixes the interpolated lines from the initial sequential scan converter 1 and the motion compensated shifted lines in the ratio k1:(1−k1). Output signals from the mixers 3 and 9 are applied to a compress and multiplex stage 15 to generate a de-interlaced output signal, which is displayed on a display unit 16.

Figure 2:
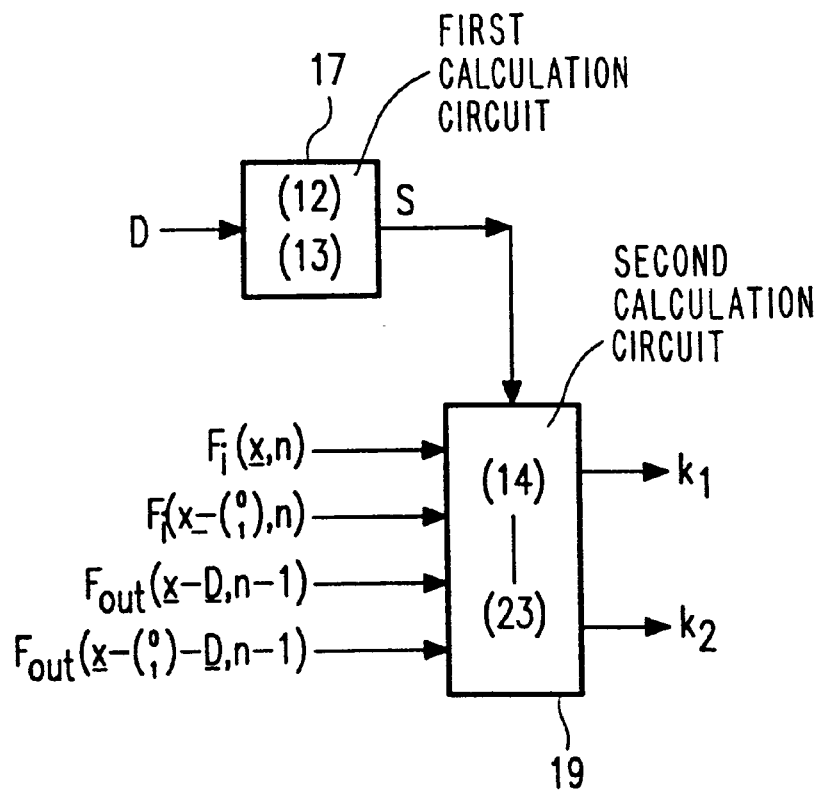
FIG. 2 shows an embodiment of a device for calculating mixer coefficients k1 and k2 for use in the embodiment of FIG. 1.

While this embodiment largely corresponds to that described in WO-A-95/27362 (Attorney's reference PHN 14,794), the present invention is mainly concerned with providing optimal values for k1 (and k2). To this end, FIG. 2 shows an embodiment of a device for calculating the mixer coefficients k1 and k2 for use in the embodiment of FIG. 1. The mixer coefficients calculating device of FIG. 2 contains a first calculation circuit 17 for calculating a vector smoothness S in response to the motion vectors D in accordance with equations 12, 13, and a second calculation circuit 19 for calculating the mixing factors k1 and k2 in dependence upon the four signals applied to the mixers 3 and 9 in accordance with equations 14 thru 23.

Figure 3:
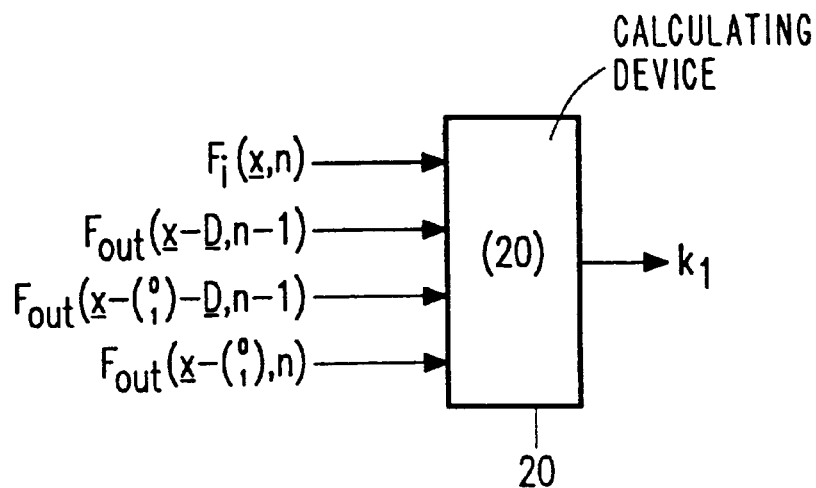
FIG. 3 shows an embodiment of a device for calculating the mixer coefficient k1 for use in the embodiment of FIG. 1.

FIG. 3 shows an embodiment of a device for calculating the mixer coefficient k1 for use in the embodiment of FIG. 1. The mixer coefficient k2 has a fixed value of 1. The mixer coefficient k1 is calculated in accordance with equation 20 by a calculating device 20.

6. Conclusion

A generally applicable improvement to existing de-interlacing algorithms and a new evaluation measure for such algorithms have been proposed in this application. A motion-compensated temporal recursive filtering is used. A typical feature of the proposal is that this filtering is not limited to the interpolated pixels only, but is extended to the filtering of the pixels existing in the interlaced input signal. This somewhat contra-intuitive action followed from the assumption that in order to have the repeat spectra of original lines compensated by that of the interpolated ones, it is essential that the two have identical frequency response. As it cannot be prevented that of the interpolated pixels may be distorted by the limited accuracy of the applied motion vectors, a similar distortion can best be applied to that of the original pixels in order to maximally suppress alias. The application of the improvement to time-recursive de-interlacing was elaborated and the improved performance was verified. The verification has to be understood in a sense that the classical $MSE_i$ performance measure had not suffered (in fact, even showed some improvement), whereas the new proposed "consistency along the motion trajectory" (MTI) had greatly improved.

In a preferred embodiment, the invention provides a method of sequential scan conversion which uses a recursive temporal filtering of at least the interpolated lines, in which the filter is controlled by locally giving a resulting consistency along the motion trajectory a fixed relation (e.g. 1), to the values determined for adjacent lines.

It should be noted that the above-mentioned embodiments illustrate rather than limit the invention, and that those skilled in the art will be able to design many alternative embodiments without departing from the scope of the appended claims. While absolute differences are described, in some embodiments, normal differences are used to preserve the sign of the difference. FIG. 1 shows a recursive embodiment, in which the outputs of the mixers 3, 9 are applied to the motion-compensation stage 7 thru the field memories 5, 11; of course, a non-recursive embodiment in which the inputs of the field memories 5, 11 are directly connected to the outputs of the initial sequential scan convertor 1 is also possible. In FIG. 1, the interpolated lines supplied by the initial sequential scan convertor 1 may be just white, black or grey lines; if an interpolation algorithm is used to obtain the interpolated lines, any algorithm will do. In the claims, any reference signs placed between parentheses shall not be construed as limiting the claim. The invention can be implemented by means of hardware comprising several distinct elements, and by means of a suitably programmed computer.

Accordingly, a preferred embodiment of the invention provides a method of generating a sequentially scanned video signal from an interlaced input signal, comprising the steps of: furnishing a first signal having first lines ($F_i(x-(0, 1)^T, n)$) corresponding to original lines of the interlaced input signal, and second lines ($F_i(x, n)$) in addition to the first lines ($F_i(x-(0, 1)^T, n)$); and providing a second signal having first motion-compensated lines ($F_{out}(x-(0, 1)^T-D, n-1)$) corresponding to the original lines, and second motion-compensated lines ($F_{out}(x-D, n-1)$) corresponding to the second lines ($F_i(x, n)$);

combining the first signal and the motion-compensated signal to obtain an output sequentially scanned video signal having first output lines ($F_{out}(x-(0, 1)^T, n)$) corresponding to the original lines, and second output lines ($F_{out}(x, n)$) between the first output lines ($F_{out}(x-(0, 1)^T, n)$);

wherein the second output lines ($F_{out}(x, n)$) are obtained in dependence upon (see equations 21 and 27):

a first difference between the first motion-compensated lines ($F_{out}(x-(0, 1)^T-D, n-1)$) and the first lines ($F_i(x-(0, 1)^T, n)$), a second difference between the second motion-compensated lines ($F_{out}(x-D, n-1)$) and the second lines ($F_i(x, n)$), and a relation ($k_2$) between the first lines ($F_i(x-(0, 1)^T, n)$) and the first output lines ($F_{out}(x-(0, 1)^T, n)$).

However, it is not necessary that the output video signal is a sequentially scanned video signal, as the invention can advantageously be used to derive an output interlaced signal having its output lines vertically positioned between the lines of the input interlaced signal. Such an interlaced-to-interlaced conversion is needed in 100 Hz conversion, where the lines one of the input interlaced fields need to be vertically shifted towards the positions of the lines of the other input interlaced field. The combining step is advantageous in a sequential scan conversion, but not necessary in other scan conversions.

Also, while the second signal is preferably obtained by means of a motion-compensated interpolation, satisfactory results can already be obtained when a less complex method is used to obtain a second signal which is delayed or advanced with respect to the first signal, like one which uses a median filter.

Finally, the dependence on the relation ($k_2$) between the first lines and the first output lines appeared to contribute to an improved result, while good results were already obtained when the output lines were dependent only on the first and second differences.

The invention can advantageously be applied in a video signal display apparatus like a television receiver or a personal computer.

7. References

[1] F. M. Wang, D. Anastassiou, and A. N. Netravali, 'Time-Recursive Deinterlacing for IDTV and Pyramid Coding', *Signal processing: Image Communication* 2, Elsevier 1990, pp. 365–374.

[2] Kwon, Seo, Kim, and Kim, 'A Motion Adaptive De-Interlacing Method', *IEEE Transactions on Consumer Electronics,* Vol. 38, No.3, 1992.

[3] G. de Haan and G. F. M. De Poortere, 'Method and apparatus for processing a picture signal', EP-A-0,474, 287.

[4] P. Delogne, L. Cuverlier, B. Maison, B. Van Caillie, and L. Vandendorpe, "Improved Interpolation, Motion Estimation, and Compensation for Interlaced Pictures", *IEEE Transactions on Image Processing*, Vol. 3, No. 5, September 1994.

[5] G. de Haan, and P. W. A. C. Biezen, 'Sub-pixel motion estimation with 3-D recursive search block-matching', *Signal Processing: Image Communication* 6 (1994), pp. 229–239.

[6] A. W. M. van den Enden and N. A. M. Verhoeckx, *Discrete-time signal processing*, Prentice Hall (ISBN 0-13-216763-8), pp. 233-.

[7] J. W. Woods and S. C. Han, "Hierarchical Motion Compensated De-interlacing", *Proc. SPIE Visual Communication and Image Processing VI*, Boston, November 1991.

[8] G. de Haan, P. W. A. C Biezen, H. Huijgen, and O. A. Ojo, "True Motion Estimation with 3-D Recursive Search Block-Matching", *IEEE Transactions on Circuits & Systems for Video Technology*, Vol. 3, October 1993, pp. 368–388.

We claim:

1. A scan conversion method of generating an output video signal from an interlaced input signal, comprising the steps of:

furnishing a first signal having first lines ($F_i(x-(0, 1)^T, n)$) corresponding to original lines of said interlaced input signal, and second separate lines ($F_i(x, n)$) in addition to said first lines ($F_i(x-(0, 1)^T, n)$); and providing a second signal which is delayed or advanced with respect to said first signal, said second signal having first processed lines ($F_{out}(x-(0, 1)^T-D, n-1)$) corresponding to said original lines, and second processed lines ($F_{out}(x-D, n-1)$) corresponding to said second lines ($F_i(x, n)$);

characterized in that output lines ($F_{out}(x, n)$) of said output video signal are obtained in dependence upon a first mixer-generated difference between said first processed lines ($F_{out}(x-(0, 1)^T-D, n-1)$) and said first lines ($F_i(x-(0, 1)^T, n)$), and a second mixer-generated difference between said second processed lines ($F_{out}(x-D, n-1)$) and said second lines ($F_i(x, n)$).

2. A method as claimed in claim 1, wherein said output video signal is a sequentially scanned video signal, and wherein the method comprises the further step of combining said first signal and said second signal to obtain an output sequentially scanned video signal having first output lines ($F_{out}(x-(0, 1)^T, n)$) corresponding to said original lines, and said output lines ($F_{out}(x, n)$) between said first output lines ($F_{out}(x-(0, 1)^T, n)$).

3. A method as claimed in claim 2, wherein said output lines ($F_{out}(x, n)$) of said output video signal are obtained further in dependence upon a relation ($k_2$) between said first lines ($F_i(x-(0, 1)^T, n)$) and said first output lines ($F_{out}(x-(0, 1)^T, n)$).

4. A method as claimed in claim 1, wherein said first processed lines ($F_{out}(x-(0, 1)^T-D, n-1)$) and said second processed lines ($F_{out}(x-D, n-1)$) are obtained by means of a motion-compensated interpolation.

5. A method as claimed in claim 2, wherein said output lines are obtained in dependence upon said second difference and a third difference between said first output lines ($F_{out}(x-(0, 1)^T, n)$) and said first processed lines ($F_{out}(x-(0, 1)^T-D, n-1)$).

6. A method as claimed in claim 2, wherein said combining step is controlled such that a difference between said output lines ($F_{out}(x, n)$) and said second processed lines ($F_{out}(x-D, n-1)$) corresponds to a difference between said first output lines ($F_{out}(x-(0, 1)^T, n)$) and said first processed lines ($F_{out}(x-(0, 1)^T-D, n-1)$).

7. A method as claimed in claim 1, wherein said first and second differences are absolute differences.

8. A scan conversion apparatus for generating an output video signal from an interlaced input signal, comprising:

means for furnishing a first signal having first lines ($F_i(x-(0, 1)^T, n)$) corresponding to original lines of said interlaced input signal, and separate second lines ($F_i(x, n)$) in addition to said first lines ($F_i(x-(0, 1)^T, n)$); and means for providing a second signal which is delayed or advanced with respect to said first signal, said second signal having first processed lines ($F_{out}(x-(0, 1)^T-D, n-1)$) corresponding to said original lines, and second processed lines ($F_{out}(x-D, n-1)$) corresponding to said second lines ($F_i(x, n)$);

characterized in that said scan conversion apparatus further comprises means for generating output lines ($F_{out}(x, n)$) of said output video signal in dependence upon a first mixer-generated difference between said first processed lines ($F_{out}(x-(0, 1)^T-D, n-1)$) and said first lines ($F_i(x-(0, 1)^T, n)$), and a second mixer-generated difference between said second processed lines ($F_{out}(x-D, n-1)$) and said second lines ($F_i(x, n)$).

9. An apparatus as claimed in claim 8, wherein said output video signal is a sequentially scanned video signal, and wherein the apparatus further comprises means for combining said first signal and said second signal to obtain an output sequentially scanned video signal having first output lines ($F_{out}(x-(0, 1)^T, n)$) corresponding to said original lines, and said output lines ($F_{out}(x, n)$) between said first output lines ($F_{out}(x-(0, 1)^T, n)$).

10. An apparatus as claimed in claim 9, wherein said output lines ($F_{out}(x, n)$) of said output video signal are obtained further in dependence upon a relation ($k_2$) between said first lines ($F_i(x-(0, 1)^T, n)$) and said first output lines ($F_{out}(x-(0, 1)^T, n)$).

11. An apparatus as claimed in claim 9, wherein said output lines are obtained in dependence upon said second difference and a third difference between said first output lines ($F_{out}(x-(0, 1)^T, n)$) and said first processed lines ($F_{out}(x-(0, 1)^T-D, n-1)$).

12. An apparatus as claimed in claim 9, wherein said combining means are controlled such that a difference between said output lines ($F_{out}(x, n)$) and said second processed lines ($F_{out}(x-D, n-1)$) corresponds to a difference between said first output lines ($F_{out}(x-(0, 1)^T, n)$) and said first processed lines ($F_{out}(x-(0, 1)^T-D, n-1)$).

13. A video signal display apparatus comprising:

means for supplying an interlaced input signal;

a scan conversion apparatus for generating an output video signal from said interlaced input signal, as claimed in claim 8; and means for displaying (16) said output video signal.

* * * * *